United States Patent Office.

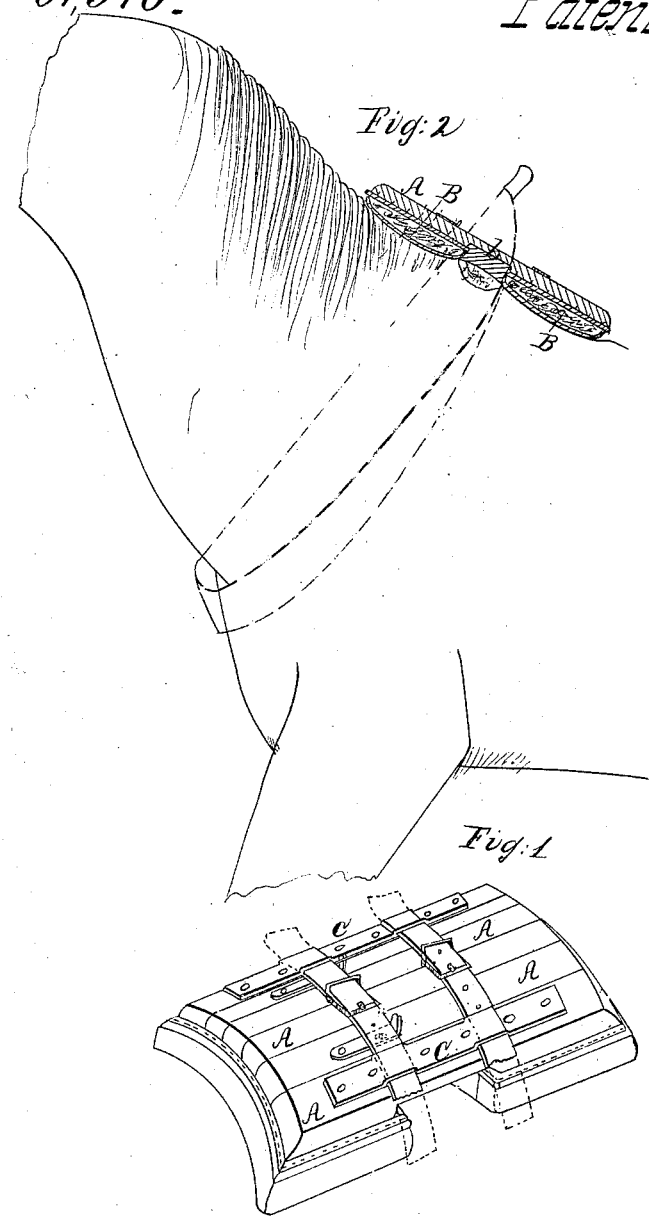

JACOB P. MEYER, OF WAUKESHA, WISCONSIN.

Letters Patent No. 61,016, dated January 8, 1867.

DEVICE FOR PROTECTING HORSES' NECKS.

The Schedule referred to in these Letters Patent and making part of the same.

TO ALL WHOM IT MAY CONCERN:

Be it known that I, JACOB P. MEYER, of Waukesha, in the county of Waukesha, and State of Wisconsin, have invented a new and improved Collar Pad; and I do hereby declare the following to be a full, clear, and exact description of the same, sufficient to enable one skilled in the art to which the invention appertains to make use of it, reference being had to the accompanying drawings, which form a part of this specification and in which—

Figure 1 is a perspective view of the pad; and

Figure 2 is a longitudinal section view of the same as applied to the horse.

This is a pad which rests upon the neck or withers of the horse, before and behind the sore spot, so that the collar may occupy its usual place, but the friction of its upper end shall not gall the spot where the abrasion has occurred. The pad is long in the direction of the length of the horse's neck, but is flexible transversely, so as to lap over the neck and assimilate to the shape of the surface upon which it is imposed, being made of a number of sections attached by a pliable connection and a middle opening, which spans the sore place irrespective of the cushion with which either or both ends of the pad are provided.

In the drawings, A A are a series of slats or sections attached by a flexible connection, B, of leather or other suitable material. The slats, while preserving the same straight contour outwardly, have a piece removed from their mid-length so as to render them thinner at that part. When the pad is laid upon a surface the ends only touch, as this middle portion, b, forms an arch over the surface. The slats are provided with loops C, through which the collar straps pass, and, when buckled on, the collar occupies its usual place, but does not rest upon that part of the neck where it usually lies, and that part, therefore, which had been rubbed sore, has an opportunity of healing without the animal being entirely disused. The ends, one or both, may have cushions, which will make the pad rest more comfortably, or the cushion may extend from end to end when the sore is nearly healed, the absence of the pressure of the slats above the sore making the cushion rest lightly at that point. The length, number, and width of the slats will vary with the occasion, the size of the animal, &c. The pad will be found useful for keeping the weight of the collar, neck yoke, and wagon tongue, and enables a horse to work comfortably when he would be otherwise distressed or useless.

Having described my invention, what I claim as new, and desire to secure by Letters Patent, is—

The pad, composed of the slats A flexibly united, and having a middle space which spans the sore, and ends which rest upon the neck or withers, with or without the cushions, substantially as described and represented.

The above specification of my device for protecting horses' necks signed this    day of

JACOB P. MEYER.

Witnesses:
 A. COOK,
 C. G. HEATH.